३,०९६,३०८
Patented July 2, 1963

3,096,308
TRIAMINOPHENOL INITIATORS FOR THE POLYMERIZATION OF FORMALDEHYDE
Henri Sidi, Paramus, and Roy T. Gottesman, Glen Rock, N.J., assignors to Heyden Newport Chemical Corporation, New York, N.Y., a corporation of Delaware
No Drawing. Filed Feb. 16, 1961, Ser. No. 89,628
7 Claims. (Cl. 260—67)

This invention relates to a process for the production of tough, high molecular weight polymers of formaldehyde. More particularly it relates to the use of tris (dialkylamino) phenols as polymerization initiators in the production of these formaldehyde polymers.

It is known that formaldehyde can be polymerized in the presence of such polymerization initiators as metal salts, phosphines, arsines, stilbenes, and certain monoamines to form tough, high molecular weight polyoxymethylene which can be used in the preparation of films, fibers, filaments, and molding compositions. It has now been found that another class of compounds can be used in the prepartion of these formaldehyde polymers.

In accordance with the present invention, substantially anhydrous monomeric formaldehyde is contacted with the novel polymerization initiator and allowed to polymerize to high molecular weight polyoxymethylene.

The novel polymerization initiators that are employed in this process are triamino phenols which have the formula

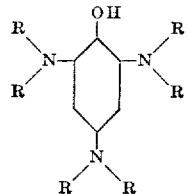

wherein each R represents an alkyl group containing from 1 to 4 carbon atoms and preferably 1 or 2 carbon atoms. In each case R groups may represent the same alkyl group or different alkyl groups. Among the specific compounds that may be used are 2,4,6-tris(dimethylamino)phenol, 2,4,6-tris(diethylamino)phenol, and 2,4,6-tris(methylethylamino)phenol. A single triaminophenol or a mixture of two or more of these compounds may be used.

The amount of the initiator that is used is generally between about 0.00001 part and 0.05 part and preferably between about 0.0001 part and about 0.005 part by weight per part by weight of formaldehyde.

The polymerization reaction may be carried out in the presence or in the absence of a liquid reaction medium or in a vapor phase reaction. It is preferably carried out in a substantially anhydrous organic medium which remains liquid under the conditions chosen for the reaction, which is inert to formaldehyde and to the polymerization initiator, and which is a non-solvent for polyoxymethylene. Suitable reaction media include hydrocarbons, chlorinated hydrocarbons, ethers, and the like. The preferred media are the hydrocarbons which contain from 3 to 10 carbon atoms, such as propane, hexane, octane, decane, cyclohexane, benzene, xylene, and decahydronaphthalene.

The amount of the reaction medium used is not critical but may be within the range of about 1 to 1000 parts by weight per part by weight of formaldehyde. In most cases about 1 to 150 parts of the medium is used for each part of formaldehyde.

The polymerization may be carried out in any convenient manner. For example, anhydrous monomeric formaldehyde may be introduced into a reactor containing a reaction medium and the polymerization initiator. Alternatively the polymerization may be carried by introducing formaldehyde continuously into a reactor containing the reaction medium and at the same time adding the polymerization initiator at such rate that the temperature is maintained within the range chosen for the polymerization.

The conditions under which the formaldehyde is polymerized are not critical. The polymerization is generally effected at a temperature between about −100° C. and 80° C. and preferably between 0° C. and 40° C. While subatmospheric and superatmospheric pressures may be employed, the reaction in most cases takes place under atmospheric pressure.

The formaldehyde monomer that is used as the starting material in this process may be derived from any convenient source. For example, it may be obtained by pyrolysis of paraformaldehyde, α-polyoxymethylene, or a hemiformal, such as cyclohexanol hemiformal. To form the desired tough, high molecular weight product, it is necessary that the formaldehyde monomer be substantially anhydrous, that is, that it contain less than 0.5% and preferably less than 0.1% by weight of water.

The formation of tough, high molecular weight polyoxymethylene is best effected under non-oxidizing conditions. A convenient way of obtaining such conditions involves sweeping the reactor with a dry inert gas, such as nitrogen, and then carrying out the polymerization under a blanket of the inert gas. In addition an antioxidant may be present during the reaction or may be added to the product to reduce oxidative effects. Among the antioxidants that may be used for this purpose are phenothiazine, 2-mercaptobenzimidazole, diphenyl amine, phenyl-α-naphthylamine, bis(β-naphthylamino)-p-phenylenediamine, and 5 - ethyl-10,10-diphenylphenazasiline. The amount of antioxidant used is generally about 0.01% to about 1% based on the weight of the formaldehyde.

The manner in which this invention may be practiced is illustrated by the following example. It is to be understood, however, that this example is not to be construed as being limitative but is furnished merely for purposes of illustration.

*Example*

Anhydrous monomeric formaldehyde was prepared by heating a suspension of 100 grams of α-polyoxymethylene in 400 ml. of paraffin oil at 114°–149° C. for approximately 2 hours. The formaldehyde vapors from this pyrolysis were passed through a series of traps, the first of which was maintained at room temperature, the second at 0° C., and the third and fourth at −10 to −20° C. The resulting anhydrous monomeric formaldehyde was introduced along with a stream of dry nitrogen into a reactor containing 1200 ml. of cyclohexane, 0.1 gram of phenothiazine, and 0.1 gram of 2,4,6-tris(dimethylaminomethyl)-phenol. The cyclohexane was prepared by topping 1500 ml. of distilled cyclohexane and removing the first 300 ml. of distillate. The reaction medium was agitated and maintained at 25°–30° C. during the reaction period. At the end of the polymerization period, the resulting slurry was filtered. The product was washed with 300 ml. of cyclohexane and dried under vacuum at 65°–70° C. to constant weight. The product, which weighed 47.2 grams, may be molded, for example, at 180° C. for 2 minutes to form a tough translucent film.

Each of the other triaminophenols that have been disclosed herein may be employed in a similar manner to initiate the polymerization of formaldehyde to form tough, high molecular weight polyoxymethylene.

Formaldehyde polymers prepared in accordance with this invention may be converted by melt extrusion, in-

What is claimed is:

1. A process for the production of high molecular weight polyoxymethylene which comprises contacting substantially anhydrous monomeric formaldehyde at a temperature in the range of approximately —100° C. to 80° C. with a polymerization initiator with a triaminophenol having the formula

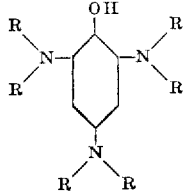

wherein each R represents an alkyl group containing from 1 to 4 carbon atoms, said polymerization initiator being present in the amount of approximately 0.00001 part to 0.05 part by weight per part by weight of said formaldehyde.

2. The process of claim 1 wherein the polymerization initiator is 2,4,6-tris(dimethylamino)phenol.

3. A process for the production of high molecular weight polyoxymethylene which comprises introducing substantially anhydrous monomeric formaldehyde into a reaction medium maintained at —100° C. to 80° C., said medium comprising a liquid hydrocarbon containing 3 to 10 carbon atoms per molecule and a polymerization initiator, said polymerization initiator being a triaminophenol having the formula

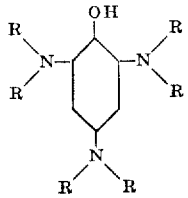

wherein each R represent an alkyl group containing from 1 to 4 carbon atoms and being present in the amount of approximately 0.00001 part to 0.05 part per part by weight of said formaldehyde, and recovering high molecular weight polyoxymethylene.

4. A process for the production of high molecular weight polyoxymethylene which comprises introducing substantially anhydrous monomeric formaldehyde into a reaction medium maintained at 0° to 40° C., said reaction medium comprising a liquid hydrocarbon containing 3 to 10 carbon atoms per molecule, an antioxidant, and a polymerization initiator, said polymerization initiator being a triaminophenol having the formula

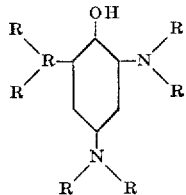

wherein each R represents an alkyl group containing from 1 to 4 carbon atoms and being present in the amount of approximately 0.00001 part to 0.05 part per part by weight of said formaldehyde, agitating said reaction medium and forming a dispersion of high molecular weight polyoxymethylene in said medium, and thereafter recovering the polyoxymethylene.

5. The process of claim 4 wherein the polymerization initiator is present in the amount of about 0.0001 part to about 0.005 part by weight per part by weight of formaldehyde.

6. The process of claim 5 wherein the reaction medium is present in the amount of 1 part to 150 parts by weight per part by weight of formaldehyde.

7. The process of claim 6 wherein the polymerization initiator is 2,4,6-tris(dimethylamino)phenol.

References Cited in the file of this patent
UNITED STATES PATENTS 2,841,570   MacDonald _____ July 1, 1958

UNITED STATES PATENT OFFICE
CERTIFICATE OF CORRECTION

Patent No. 3,096,308　　　　　　　　　　　　　　July 2, 1963

Henri Sidi et al.

It is hereby certified that error appears in the above numbered patent requiring correction and that the said Letters Patent should read as corrected below.

Column 1, line 22, for "prepartion" read -- preparation --; column 2, line 2, after "carried" insert -- out --; line 5, after "such" insert -- a --.

Signed and sealed this 7th day of January 1964.

(SEAL)
Attest:

ERNEST W. SWIDER

Attesting Officer

EDWIN L. REYNOLDS

Acting Commissioner of Patents